United States Patent [19]
Archey

[11] Patent Number: 5,876,309
[45] Date of Patent: Mar. 2, 1999

[54] JOGGING EXERCISE STROLLER

[76] Inventor: Oatess E. Archey, 2120 W. Second St. #210A, Marion, Ind. 46952

[21] Appl. No.: 116,968

[22] Filed: Jul. 16, 1998

[51] Int. Cl.[6] .................................................. A63B 21/045
[52] U.S. Cl. .................................. 482/66; 482/68; 482/14
[58] Field of Search ........................... 280/304.1, 47.371, 280/47.36, 47.38, 79.2; 482/66, 74, 111, 112, 68, 62

[56] References Cited

U.S. PATENT DOCUMENTS

| | | | |
|---|---|---|---|
| 5,005,829 | 4/1991 | Caruso | 482/904 |
| 5,294,141 | 3/1994 | Mentessi et al. | 280/304.1 |
| 5,344,171 | 9/1994 | Garforth-Bles | 280/47.38 |
| 5,407,414 | 4/1995 | Bass | 482/904 |
| 5,665,034 | 9/1997 | Hwang | 482/112 |
| 5,674,165 | 10/1997 | Cohen et al. | 280/47.371 |
| 5,762,593 | 6/1998 | Whitely | 482/904 |

*Primary Examiner*—Jerome W. Donnelly

[57] ABSTRACT

A new jogging exercise stroller for allowing joggers to move their arms in a more natural jogging motion. The inventive device includes a stroller portion defined by a frame member. The frame member has a pair of rear wheels and a forward wheel. The frame member has a seat portion disposed therein. The frame member includes a lower cross bar and an upper cross bar. The upper cross bar has a pair of annular recesses extending therearound at opposing ends thereof. A pair of arcuate handles are coupled with the stroller portion. The handles each have a lower end coupled with the annular recesses of the upper cross bar. A pair of shock absorbers extend between the pair of arcuate handles and the lower cross bar of the stroller portion.

7 Claims, 2 Drawing Sheets

JOGGING EXERCISE STROLLER

BACKGROUND OF THE INVENTION

1. Field of the Invention

The present invention relates to jogging strollers and more particularly pertains to a new jogging exercise stroller for allowing joggers to move their arms in a more natural jogging motion.

2. Description of the Prior Art

The use of jogging strollers is known in the prior art. More specifically, jogging strollers heretofore devised and utilized are known to consist basically of familiar, expected and obvious structural configurations, notwithstanding the myriad of designs encompassed by the crowded prior art which have been developed for the fulfillment of countless objectives and requirements.

Known prior art jogging strollers include U.S. Pat. No. 4,953,880 to Sudakoff et al.; U.S. Pat. No. 5,375,861 to Gifford; U.S. Pat. No. 2,854,241 to Dobrowolski; U.S. Pat. No. 3,566,861 to Weiss; U.S. Pat. No. 4,850,585 to Dalebout; and U.S. Pat. No. 3,305,244 to Flagg.

While these devices fulfill their respective, particular objectives and requirements, the aforementioned patents do not disclose a new jogging exercise stroller. The inventive device includes a stroller portion defined by a frame member. The frame member has a pair of rear wheels and a forward wheel. The frame member has a seat portion disposed therein. The frame member includes a lower cross bar and an upper cross bar. The upper cross bar has a pair of annular recesses extending therearound at opposing ends thereof. A pair of arcuate handles are coupled with the stroller portion. The handles each have a lower end coupled with the annular recesses of the upper cross bar. A pair of shock absorbers extend between the pair of arcuate handles and the lower cross bar of the stroller portion.

In these respects, the jogging exercise stroller according to the present invention substantially departs from the conventional concepts and designs of the prior art, and in so doing provides an apparatus primarily developed for the purpose of allowing joggers to move their arms in a more natural jogging motion.

SUMMARY OF THE INVENTION

In view of the foregoing disadvantages inherent in the known types of jogging strollers now present in the prior art, the present invention provides a new jogging exercise stroller construction wherein the same can be utilized for allowing joggers to move their arms in a more natural jogging motion.

The general purpose of the present invention, which will be described subsequently in greater detail, is to provide a new jogging exercise stroller apparatus and method which has many of the advantages of the jogging strollers mentioned heretofore and many novel features that result in a new jogging exercise stroller which is not anticipated, rendered obvious, suggested, or even implied by any of the prior art jogging strollers, either alone or in any combination thereof.

To attain this, the present invention generally comprises a stroller portion defined by a frame member. The frame member has a pair of rear wheels and a forward wheel. The frame member has a seat portion disposed therein. The frame member includes a lower cross bar and an upper cross bar. The upper cross bar has a pair of annular recesses extending therearound at opposing ends thereof. Each of the annular recesses have a bearing member disposed therearound. A pair of arcuate handles are coupled with the stroller portion. The handles each have a lower end coupled with the annular recesses of the upper cross bar. The handles each have a gripping member disposed on upper ends thereof. Each gripping member has a safety strap disposed thereon. A pair of shock absorbers extend between the pair of arcuate handles and the lower cross bar of the stroller portion. A resistance unit is coupled with the stroller portion. The resistance unit includes a pair of arcuate pads coupled with respect to the pair of rear wheels. The arcuate pads have a cable extending outwardly therefrom. The cable has a free end coupled with a resistance dial. The resistance dial is positionable on the frame member of the stroller portion. A speedometer/odometer is coupled with the upper cross bar. The speedometer/odometer has a cable coupled with one of the rear wheels of the stroller portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new jogging exercise stroller apparatus and method which has many of the advantages of the jogging strollers mentioned heretofore and many novel features that result in a new jogging exercise stroller which is not anticipated, rendered obvious, suggested, or even implied by any of the prior art jogging strollers, either alone or in any combination thereof.

It is another object of the present invention to provide a new jogging exercise stroller which may be easily and efficiently manufactured and marketed.

It is a further object of the present invention to provide a new jogging exercise stroller which is of a durable and reliable construction.

An even further object of the present invention is to provide a new jogging exercise stroller which is susceptible of a low cost of manufacture with regard to both materials and labor, and which accordingly is then susceptible of low prices of sale to the consuming public, thereby making such jogging exercise stroller economically available to the buying public.

Still yet another object of the present invention is to provide a new jogging exercise stroller which provides in the apparatuses and methods of the prior art some of the advantages thereof, while simultaneously overcoming some of the disadvantages normally associated therewith.

Still another object of the present invention is to provide a new jogging exercise stroller for allowing joggers to move their arms in a more natural jogging motion.

Yet another object of the present invention is to provide a new jogging exercise stroller which includes a stroller portion defined by a frame member. The frame member has a pair of rear wheels and a forward wheel. The frame member has a seat portion disposed therein. The frame member includes a lower cross bar and an upper cross bar. The upper cross bar has a pair of annular recesses extending therearound at opposing ends thereof. A pair of arcuate handles are coupled with the stroller portion. The handles each have a lower end coupled with the annular recesses of the upper cross bar. A pair of shock absorbers extend between the pair of arcuate handles and the lower cross bar of the stroller portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2, 3:
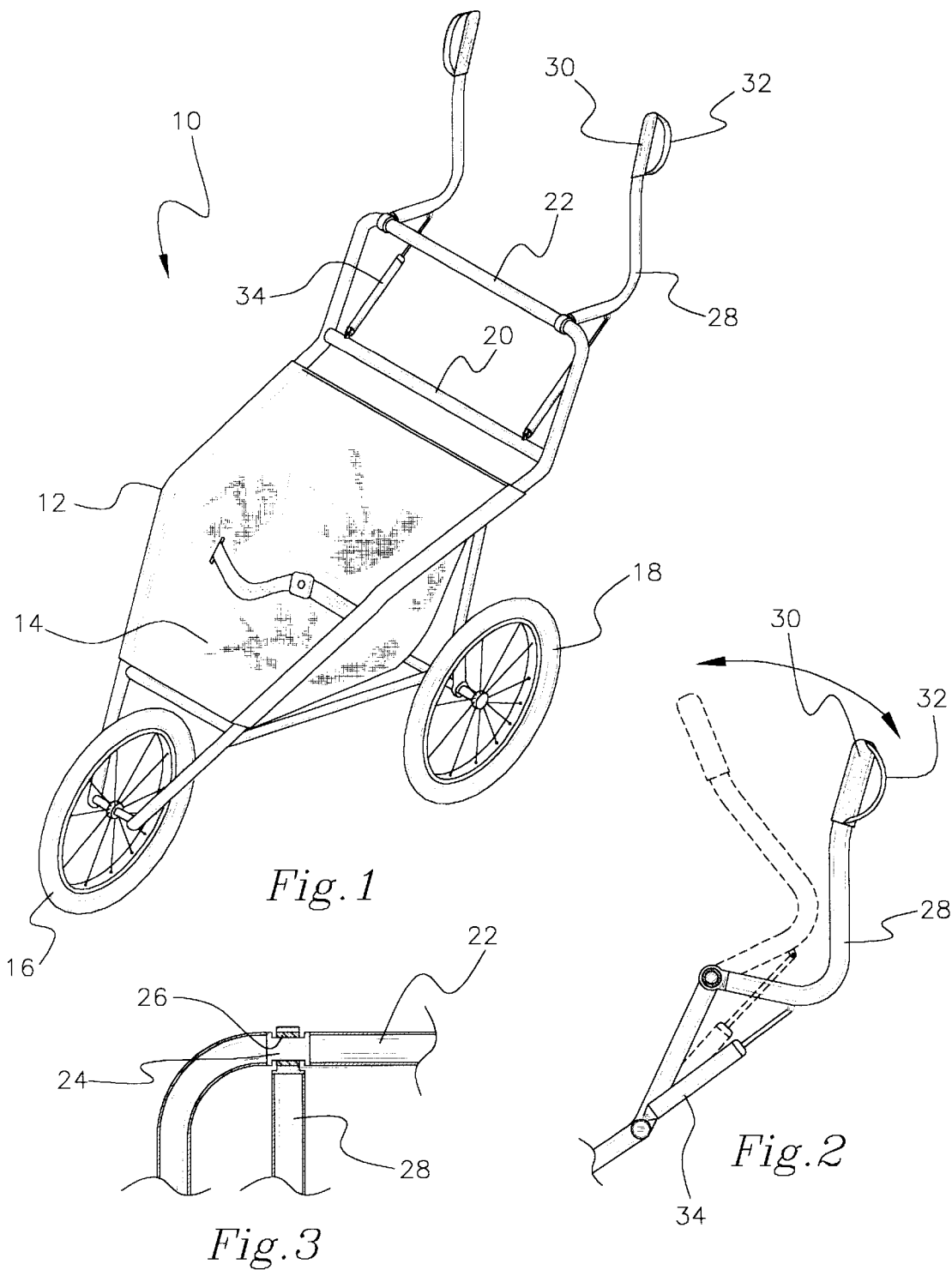
FIG. 1 is a perspective view of a new jogging exercise stroller according to the present invention.
FIG. 2 is a partial side view of the present invention illustrating the handle and shock thereof.
FIG. 3 is a sectional view of the present invention illustrating the handle as coupled with the upper cross bar.
Figure 4:
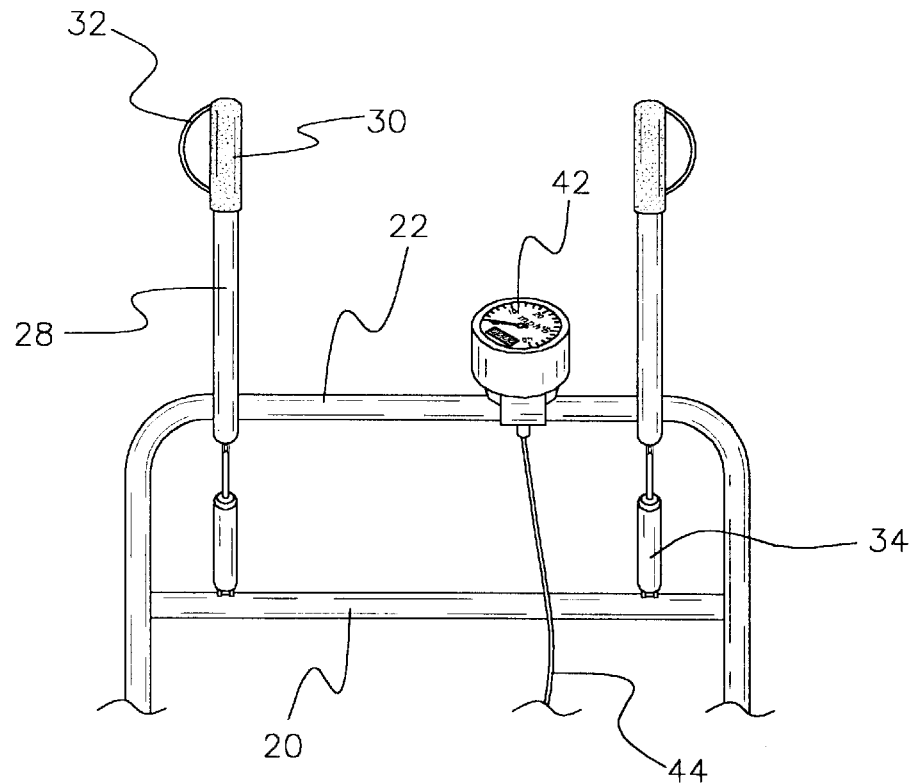
FIG. 4 is a partial front view of the present invention.
Figure 6:
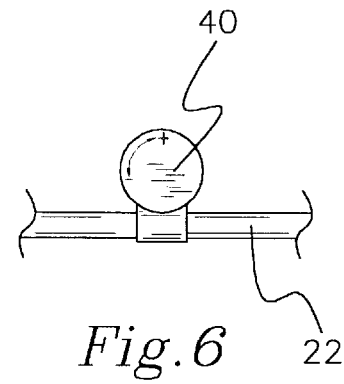
FIG. 6 is a front view of the resistance dial of the present invention.
Figure 5:
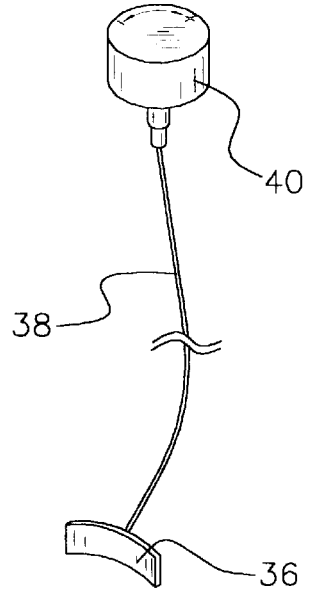
FIG. 5 is a perspective view of the resistance unit of the present invention.
Figure 7:
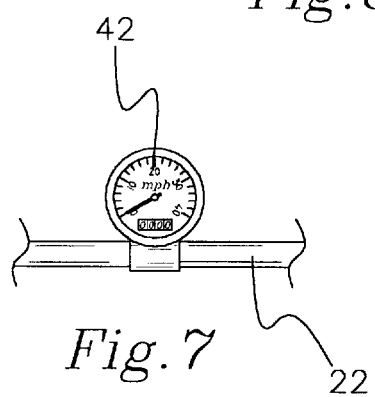
FIG. 7 is a front view of the speedometer of the present invention.

With reference now to the drawings, and in particular to FIGS. 1 through 7 thereof, a new jogging exercise stroller embodying the principles and concepts of the present invention and generally designated by the reference numeral 10 will be described.

As best illustrated in FIGS. 1 through 7, the jogging exercise stroller 10 comprises a stroller portion 12 defined by a frame member. The frame member has a pair of rear wheels 14 and a forward wheel 16. The frame member has a seat portion 18 disposed therein. The seat portion 18 includes a seat belt for securement of a child. The frame member includes a lower cross bar 20 and an upper cross bar 22. The upper cross bar 22 has a pair of annular recesses 24 extending therearound at opposing ends thereof. Each of the annular recesses 24 have a bearing member 26 disposed therearound.

A pair of arcuate handles 28 are coupled with the stroller portion 12. The handles 28 each have a lower end coupled with the annular recesses 24 of the upper cross bar 22. The handles 28 would be able to move up and down with the aid of the bearing members 26. The handles 28 each have a gripping member 30 disposed on upper ends thereof. Each gripping member 30 has a safety strap 32 disposed thereon. The gripping members 30 would be grasped by the user with the safety straps 32 wrapped around their wrists to prevent the device 10 from slipping out of the user's hands.

A pair of shock absorbers 34 extend between the pair of arcuate handles 28 and the lower cross bar 20 of the stroller portion 12. The shock absorbers 34 allow the handles 28 to rotate halfway, so that the person pushing the stroller portion 12 could maintain a natural back-and-forth arm motion as he or she walked, jogged, or ran with the device 10.

A resistance unit is coupled with the stroller portion 12. The resistance unit includes a pair of arcuate pads 36 coupled with respect to the pair of rear wheels 18. The arcuate pads 36 have a cable 38 extending outwardly therefrom. The cable 38 has a free end coupled with a resistance dial 40. The resistance dial 40 is positionable on the frame member of the stroller portion 12. The resistance dial 40 can be adjust the amount of resistance the arcuate pads 36 place on the rear wheels 18 according to the need of the user.

A speedometer/odometer 42 is coupled with the upper cross bar 22. The speedometer/odometer 42 has a cable 44 coupled with one of the rear wheels 18 of the stroller portion 12.

In use, the present invention would provide motion to the handles 28 which would allow walkers, joggers, and runners to maintain free and unhampered movement in their arms and legs, which may otherwise be constricted or distorted by gripping a stationary horizontal handlebar.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new jogging exercise stroller for allowing joggers to move their arms in a more natural jogging motion comprising, in combination:

a stroller portion defined by a frame member, the frame member having a pair of rear wheels and a forward wheel, the frame member having a seat portion disposed therein, the frame member including a lower cross bar and an upper cross bar, the upper cross bar having a pair of annular recesses extending therearound at opposing ends thereof, each of the annular recesses having a bearing member disposed therearound;

a pair of arcuate handles coupled with the stroller portion, the handles each having a lower end coupled with the annular recesses of the upper cross bar, the handles each having a gripping member disposed on upper ends thereof, each gripping member having a safety strap disposed thereon;

a pair of shock absorbers extending between the pair of arcuate handles and the lower cross bar of the stroller portion;

a resistance unit coupled with the stroller portion, the resistance unit including a pair of arcuate pads coupled with respect to the pair of rear wheels, the arcuate pads having a cable extending outwardly therefrom, the cable having a free end coupled with a resistance dial, the resistance dial being positionable on the frame member of the stroller portion;

a speedometer/odometer coupled with the upper cross bar, the speedometer/odometer having a cable coupled with one of the rear wheels of the stroller portion.

2. A new jogging exercise stroller for allowing joggers to move their arms in a more natural jogging motion comprising, in combination:

a stroller portion defined by a frame member, the frame member having a pair of rear wheels and a forward wheel, the frame member having a seat portion disposed therein, the frame member including a lower cross bar and an upper cross bar, the upper cross bar having a pair of annular recesses extending therearound at opposing ends thereof;

a pair of arcuate handles coupled with the stroller portion, the handles each having a lower end coupled with the annular recesses of the upper cross bar;

a pair of shock absorbers extending between the pair of arcuate handles and the lower cross bar of the stroller portion.

3. The jogging exercise stroller as set forth in claim 2 wherein each of the annular recesses of the frame member of the stroller portion have a bearing member disposed therearound.

4. The jogging exercise stroller as set forth in claim 2 wherein the handles each have a gripping member disposed on upper ends thereof.

5. The jogging exercise stroller as set forth in claim 4 wherein each gripping member has a safety strap disposed thereon.

6. The jogging exercise stroller as set forth in claim 2 and further including a resistance unit coupled with the stroller portion, the resistance unit including a pair of arcuate pads coupled with respect to the pair of rear wheels, the arcuate pads having a cable extending outwardly therefrom, the cable having a free end coupled with a resistance dial, the resistance dial being positionable on the frame member of the stroller portion.

7. The jogging exercise stroller as set forth in claim 2 and further including a speedometer/odometer coupled with the upper cross bar, the speedometer/odometer having a cable coupled with one of the rear wheels of the stroller portion.

* * * * *